FIGURE I

United States Patent Office 3,652,515
Patented Mar. 28, 1972

3,652,515
NOVEL PROCESS WHEREIN MONOMERS AND DILUENT SOLVENT ARE RECOVERED FROM FLASHED EFFLUENT FROM THE POLYMERIZATION OF ETHYLENE, A $C_3$-$C_{10}$ HIGHER ALPHA OLEFIN, AND OPTIONALLY A THIRD MONOMER
James H. Love, Somerville, N.J., assignor to Esso Research and Engineering Company
Filed Dec. 8, 1969, Ser. No. 883,042
Int. Cl. C08f 15/40, 15/04
U.S. Cl. 260—80.78                    12 Claims

ABSTRACT OF THE DISCLOSURE

Monomers and diluent-solvent are recovered from flashed effluent from the polymerization of ethylene, a $C_3$ to $C_{10}$ higher alpha olefin, and optionally third monomer.

BACKGROUND OF THE INVENTION

This invention relates to a process for preparing novel polymer compositions. More specifically, it relates to improvements in the production of copolymers of ethylene and higher alpha olefins.

As is well known to those skilled in the art, copolymers of ethylene and higher alpha olefins, such as propylene, with other polymerizable third monomers have been prepared. Typical of these other or third monomers may be nonconjugated dienes such as 5-methylidene-2-norbornene (MNB), 5-ethylidene-2-norbornene (ENB), dicyclopentadiene, or 1,4-hexadiene.

Typically the polymerization reaction to form the copolymer may be carried out in the presence of a catalyst composition including a compound of a transition metal halide, typically vanadyl chloride $VOCl_3$ and, as a co-catalyst, an organometal compound, typically diethyl aluminum chloride. The reaction may be carried out in the presence of a non-reactive reaction medium or diluent-solvent which may be a saturated aliphatic hydrocarbon such as propane, pentane, hexane, or heptane, preferably hexane; an aromatic hydrocarbon such as toluene; or a chloro-hydrocarbon such as tetrachloroethylene. The reaction may be under substantially anhydrous and anaerobic conditions. Water and oxygen must be excluded from the system to obtain maximum copolymer yield; and the reactants may be treated to insure that they are oxygen-free and dry.

Upon termination of the reaction, the reaction mixture may contain the desired product copolymer (typically the terpolymer of ethylene, higher alpha olefin, and third monomer) together with light components containing unreacted ethylene and unreacted propylene, and heavy components containing unreacted third monomer, diluent-solvent, by-product oligomers, and catalyst residues including mainly spent catalyst. A substantial portion of the operating and capital expense for a polymer plant is directed to the separation of the polymer from the reactor effluent and to the recovery therefrom of the unreacted monomers and diluent-solvent.

It is an object of this invention to provide a process for effecting recovery of solvent-diluent and unreacted monomers. Other objects will be apparent to those skilled in the art from the inspection of the following description.

SUMMARY OF THE INVENTION

In accordance with certain of its aspects, the novel improvement of this invention in the process for preparing a copolymer of ethylene and a $C_3$ to $C_{10}$ higher alpha olefin including forming a mixture of monomers of ethylene and $C_3$ to $C_{10}$ higher alpha olefin; contacting said mixtures in a reaction medium including a liquid diluent-solvent with a polymerization catalyst composition thereby forming a copolymer of ethylene and a $C_3$ to $C_{10}$ higher alpha olefin; withdrawing from said reaction medium a liquid reactor effluent containing catalyst composition, unreacted monomers, heavy impurities, and a cement of copolymer in said liquid diluent-solvent; and recovering diluent-solvent, may comprise:

(a) flashing said liquid reactor effluent in the presence of steam thereby forming a flash overhead gas containing diluent-solvent, unreacted monomer, heavy impurities, and water;

(b) rectifying said flash overhead gas thereby forming: a two-phase rectifier bottoms including (i) a non-aqueous phase containing diluent-solvent and heavy impurities; and (ii) an aqueous phase; and a rectifier overhead containing diluent-solvent, unreacted monomers and water;

(c) stripping the non-aqueous phase of said rectifier bottoms thereby forming (i) stripper bottoms, containing a major portion of said heavy impurities and (ii) stripper overhead containing diluent-solvent;

(d) passing said stripper overhead to said rectifying operation;

(e) condensing said rectifier overhead thereby recovering (i) unreacted monomer gas, (ii) condensed non-aqueous phase containing diluent-solvent substantially free of heavy impurities, and (iii) condensed water;

(f) passing a first portion of said condensed non-aqueous phase to said rectifying operation as reflux; and (g) withdrawing a second portion of said condensed non-aqueous phase containing diluent-solvent.

DESCRIPTION OF THE INVENTION

The ethylene used in practice of this invention as first monomer may typically be purified commercially available ethylene of greater than 99.0% purity, typically 99.0%–99.5%, say 99.5%.

The higher alpha olefin, also called a terminal olefin, which may be used in the practice of this invention as a second monomer, may be a purified commercially available $C_3$ to $C_{10}$ olefin having a purity of greater than 75%, typically 50%–99%, say 90%. Non-polar impurities, such as ethane, propane, or other hydrocarbons, may be present, but for best results, polar compounds such as oxygen, water, carbon minoxide, carbon dioxide, etc., should be maintained at a low level in the ethylene and alpha olefin feed.

The higher alpha olefins having three to ten carbon atoms may be designated by the formula $R'$—CH=$CH_2$ wherein $R'$ is hydrocarbon and typically alkyl including cycloalkyl. Alpha olefins may include typically:

TABLE I

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

The preferred higher alpha olefins may be propylene, i.e. propene.

The nonconjugated diolefins which may be third monomer components of the copolymers of this invention may preferbaly include those having 5–14 carbon atoms. Typical of the nonconjugated diolefins may be the following:

(A) Straight chain acyclic dienes such as: 1,4-hexadiene; 1,6-octadiene.

(B) Branched chain acyclic dienes such as: 5-methyl 1, 4-hexadiene; 3,7-dimethyl-1,6-octadiene; 3,7-dimethyl-1, 7-octadiene; and the mixed isomers of dihydro-myrcene, and dihydro-ocimene.

(C) Single ring alicyclic dienes such as: 1,4-cyclohexadiene; 1,5-cyclooctadiene; and 1,5-cyclododecadiene.

(D) Multi-ring alicyclic fused and bridged ring dienes such as: tetrahydroindene; methyltetrahydroindene; dicyclopentadiene; bicyclo (2,2,1) hepta 2,5-diene; alkenyl, alkylidene, cyclo-alkenyl and cyclo-alkylidene norbornenes such as 5-methylene-2-norbornene, 5-ethylidene-2-norbornene, 5-propenyl-2-norbornene, 5-isopropylidene-2-norbornene, 5-(4-cyclopentenyl)-2-norbornene; 5-cyclohexylidene-2-norbornene.

The preferred third monomers may be 5-ethylidene-2-norbornene, dicyclopentadiene, or 5-methylene-2-norbornene. Most preferred is 5-ethylidene-2-norbornene.

Formation of the novel copolymers of this invention may be effected by forming a mixture of the monomer components containing the following components by weight, these being per 100 parts of solvent:

TABLE II

| Component | Broad range | Preferred range | Typical |
|---|---|---|---|
| Ethylene | 0.1–10.0 | 1.0–6.0 | 2.75 |
| Higher alpha olefin | 0.1–20.0 | 1.0–15.0 | 12.5 |
| Diolefin | 0.0–2.0 | 0.0–1.0 | 0.22 |

In Table II, as elsewhere in this specification, all parts are parts by weight unless otherwise specifically stated.

Mixtures of these monomers may be used, i.e. more than one alpha olefin and/or more than one diolefin may be employed. It will be noted that when only ethylene and higher alpha olefin are present, the interpolymer or copolymer product may be a two-component copolymer; when the diolefin is present, the copolymer is a terpolymer. Other compatible components, including those which are copolymerizable to form tetrapolymers, may be present, etc.

The monomer mixture may be polymerized (either batchwise or continuously) to form the desired polymer in the presence of a catalytic amount of a catalyst composition containing, as catalyst, a compound of a transition metal as catalyst and, as cocatalyst, an organometal compound. Thus, the catalyst composition may typically include:

(A) A compound, preferably a halide, of a transition metal, i.e. a metal of Groups I–B through VII–B and VIII of the Periodic Table and having an atomic number falling within the range of 21–30, 39–48, 57–80, and 80–130. The first category including metals starting with scandium 21 and ending with zinc 30 may be preferred; and titanium 22 and vanadium 23 may be most preferred. The halide may be a chloride, bromide, or iodide, preferably chloride. The preferred compound may be titanium tetrachloride or vanadium tetrachloride.

(B) An organometal compound (of a metal of Groups I–A, II–A, II–B, and III–A), preferably an organoaluminum compound $R'''_nAlX_{3-n}$ wherein $R'''$ may be hydrocarbon moiety, typically alkyl, aryl, aralkyl, or alkaryl, X is a halogen, and $n$ is an integer 1–3. An organometal compound is one characterized by the presence of at least one carbon-to-metal bond. The preferred metal is aluminum. Typical compounds may be $R_2'''Zn$, $R_3'''Al$, $R_2'''AlX$, $R'''AlX_2$, and most preferably $R_2'''AlX$; and the preferred compound may be diethyl aluminum chloride or triisobutyl aluminum.

The preferred catalyst composition may include 0.00001–0.0001 mole, say 0.00005 mole of transition metal halide catalyst and 0.00007–0.0007 mole, say 0.00035 mole of organoalumiunm cocatalyst.

Polymerization may be effected by passing 0.1–10, say 2.75 parts of ethylene, 0.1–20, say 12.5 parts of alpha olefin, typically propylene, and 0–1.0, say 0.22 parts of diolefin third monomer, typically 5-ethylidene-2-norbornene when employed into 100 parts of liquid inert-diluent-solvent reaction medium containing catalyst and cocatalyst in catalytic amounts, i.e. 0.0017–0.017, say 0.00865 part of catalyst and 0.0084–0.084, say 0.042 part of cocatalyst per 100 parts of diluent-solvent. The nonreactive reaction medium may be an aromatic hydrocarbon such as toluene, a saturated aliphatic hydrocarbon such as heptane, pentane, and hexane, or a chlorohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as introgen or methane.

During polymerization, the reaction mixture may be agitated and maintained at temperatures of −40° C. to 100° C., say −10° C. to 70° C., preferably about 30° C. and pressures of 0–1000 p.s.i.g., preferably 0–300 p.s.i.g., say 60 p.s.i.g., during a period of 1–300 minutes, preferably 3–60 minutes, say 15 minutes.

At the end of this period, the polymerization may be found to be complete. The catalyst may be deactivated as by addition of an alcohol such as isopropanol. The mixture may be deashed as by mixing with aqueous medium, preferably aqueous hydrochloride and; the organic layer may be separated and found to contain the following:

TABLE III

| Component | Typical parts | Preferred |
|---|---|---|
| Unreacted ethylene | 0.1–0.5 | 0.275 |
| Unreacted higher alpha olefin | 7.5–12 | 9.85 |
| Unreacted third monomer | 0.04–0.1 | 0.065 |
| Product copolymer | 3.0–7.0 | 5.1 |
| Diluent-solvent | 90–110 | 100 |
| Heavy impurities | 0.01–0.1 | 0.075 |

In practice of the process of this invention, the organic layer at typical temperature of 30° C.–70° C., say 40° C. and pressure of 50 p.s.i.g.–150 p.s.i.g., say 60 p.s.i.g., may be steam-flashed through a nozzle or pressure releasing valve to a pressure of 0 p.s.i.g.–50 p.s.i.g., say 15 p.s.i.g and a temperature of 70° C.–120° C., say 100° C. to yield a bottoms of aqueous polymer slurry as follows:

TABLE IV

| Component | Typical parts | Preferred |
|---|---|---|
| Product copolymer | 2–7 | 3 |
| Aqueous phase | 93–98 | 97 |

The flash overhead gas may typically contain diluent-solvent and heavy impurities; in normal operations, it may also contain unreacted ethylene, unreacted higher alpha olefin, unreacted third monomer, and water vapor. Commonly it may have the following components:

TABLE V

| Component | Typical parts | Preferred |
|---|---|---|
| Unreacted ethylene | 0.1–0.5 | 0.275 |
| Unreacted higher alpha olefin | 7.5–12 | 9.85 |
| Unreacted third monomer | 0.05–0.1 | 0.065 |
| Diluent-solvent | 90–110 | 100 |
| Heavy impurities | 0.01–0.1 | 0.075 |
| Water (vapor) | 10–20 | 15.8 |

In practice of this invention, the flash overhead gas may be rectified. Rectification, without preliminary condensation of this gas, permits attainment of high thermal efficiency and of minimum capital and operating costs. Rectification may be effected by passing this gas at 80° C. to 150° C., say 110° C. into a rectification tower at 0 p.s.i.g. to 50 p.s.i.g., say 15 p.s.i.g., wherein it may be subjected to vapor-liquid contact. Rectification overhead at 40° C. to 130° C., say 74° C., may typically contain the following components:

TABLE VI

| Component | Typical parts | Preferred |
|---|---|---|
| Unreacted ethylene | 0.01–0.5 | 0.315 |
| Unreacted higher alpha olefin | 2–15 | 11.69 |
| Unreacted third monomer | 0–0.1 | 0 |
| Diluent-solvent | 110–230 | 168 |
| Heavy impurities | 0.001–0.5 | 0.008 |
| Water (vapor) | 5–15 | 10 |

Rectifier overhead may commonly contain less than about 70% (more commonly less than about 15%) of the heavy impurities in the flash overhead gas charged to the rectifier. Commonly, it may contain 1.3%–70%, say 10%, of said heavy impurities.

Overhead product vapor from the drying tower (as set forth in Table XIII infra) may be combined with rectification overhead and condensed therewith to form a total overhead.

Typically, this total overhead may be condensed to 20° C. to 80° C., say 40° C., by cooling, in indirect heat exchange, with cooling liquid, preferably water, at 15° C. to 50° C., say 30° C. 100 to 250 parts, say 202.8 parts, condensate (and non-condensed gases) may be collected in a reflux drum.

The total condensate, 100 to 250 parts, say 182.3 parts, collected in the reflux drum may have the following composition:

TABLE VII

| Component | Typical parts | Preferred parts |
|---|---|---|
| First liquid phase: | | |
| Unreacted ethylene | 0.005–0.5 | 0.08 |
| Unreacted higher alpha olefin | 1.5–10 | 4.62 |
| Unreacted third monomer | 0–0.1 | 0 |
| Diluent-solvent | 110–240 | 167.9 |
| Heavy impurities | 0.001–0.05 | 0.008 |
| Water (dissolved in diluent-solvent) | 0–0.1 | 0.03 |
| Second liquid phase, aqueous phase | 5–15 | 9.67 |

The non-condensed gas collected in amount of 3 to 60 parts, say 20.5 parts, in the reflux drum may have the following composition:

TABLE VIII

| Component | Typical parts | Preferred parts |
|---|---|---|
| Unreacted ethylene | 0.01–0.5 | 0.275 |
| Unreacted higher alpha olefin | 2–12 | 9.85 |
| Unreacted third monomer | 0–0.05 | 0 |
| Diluent-solvent | 1–15 | 10.1 |
| Water | 0.1–1 | 0.3 |

This gas may be withdrawn and recycled to the polymerization reaction or, if desired, to monomer recovery and purification operations.

The aqueous second or immiscible phase collected in the reflux drum in amount of 5 to 15 parts, say 9.67 parts, which normally will be substantially entirely aqueous condensate, may be withdrawn and recycled to deashing.

The first liquid phase in the reflux drum, in amount of 100 to 250 parts, say 172.6 parts, may normally contain substantial quantities of diluent-solvent. A first portion of 20% to 75%, say 40.7%, i.e. 36 to 200 parts, say 70.2 parts, of this first liquid phase may be returned as reflux to the rectification operation, preferably to yield a reflux ratio of 0.35:1 to 2:1, say 0.6:1, i.e. pumped back reflux to total overhead products. Preferably, pumped reflux may be at temperatures of 20° C. to 80° C., say 40° C. and pressure of 0 p.s.i.g. to 45 p.s.i.g., say 5 p.s.i.g.

Rectification may produce as bottoms at 40° C. to 110° C., say 75° C., and 0 p.s.i.g. to 50 p.s.i.g., say 15 p.s.i.g., 10 to 80 parts, say 45.1 parts of a two-phase rectifier bottoms containing the following components:

TABLE IX

| Component | Typical parts | Preferred parts |
|---|---|---|
| Non-aqueous phase: | | |
| Unreacted ethylene | 0–0.2 | 0 |
| Unreacted higher alpha olefin | 0.01–0.4 | 0.06 |
| Unreacted third monomer | 0.05–1 | 0.22 |
| Diluent-solvent | 10–80 | 38.2 |
| Heavy impurities | 0.1–3 | 0.835 |
| Water (dissolved in diluent-solvent) | 0.01–0.1 | 0.03 |
| Aqueous phase, water | 0–15 | 5.8 |

The lower aqueous phase, in amount of 0 to 15 parts, say 5.8 parts, at 40° C. to 110° C., say 75° C., and 0 p.s.i.g. to 50 p.s.i.g., say 15 p.s.i.g., may be withdrawn and passed to deashing.

The non-aqueous phase of the rectifier bottoms, in amount of 10 to 80 parts, say 39.3 parts, may be passed to a stripping operation. In one embodiment the stripping operation may be carried out in the same distillation tower as that in which rectification is carried out. In another embodiment, the stripping operation may be carried out in a distillation tower separate from that in which the rectification operation is carried out.

Stripping may be effected at feed temperature of 40° C. to 110° C., say 75° C., and feed pressure of 0 to 50 p.s.i.g., say 15 p.s.i.g., with steam or more preferably with a reboiler to yield 0.08 to 2.5 parts, say 0.45 part, of a stripper bottoms at 100° C. to 200° C., say 138° C., containing a major portion (typically greater than 30%, commonly 30% to 100%, and commonly about 95%) of the heavy impurities from the flash overhead gas and having the following composition:

TABLE X

| Component | Typical parts | Preferred parts |
|---|---|---|
| Unreacted ethylene | 0–0.01 | 0 |
| Unreacted higher alpha olefin | 0–0.01 | 0 |
| Unreacted third monomer | 0.02–0.4 | 0.065 |
| Diluent-solvent | 0.05–2.0 | 0.173 |
| Water (dissolved in diluent-solvent) | 0–0.01 | 0 |
| Heavy impurities | 0.01–0.15 | 0.072 |

Stripper bottoms may be passed to a recovery unit to separate therefrom the heavy impurities and the remaining components may be recirculated.

The stripper overhead in amount of 10 to 80 parts, say 38.8 parts, at 60° C. to 150° C., say 97° C., and 15 to 70 p.s.i.g., say 20 p.s.i.g., may be passed to the rectification operation and preferably it will be combined with the feed thereto. Stripper overhead may have the following composition:

TABLE XI

| Component | Typical parts | Preferred parts |
|---|---|---|
| Unreacted ethylene | 0–0.2 | 0 |
| Unreacted higher alpha olefin | 0.01–0.4 | 0.06 |
| Unreacted third monomer | 0.001–0.4 | 0.155 |
| Diluent-solvent | 10–80 | 38.03 |
| Heavy impurities | 0.1–3 | 0.763 |
| Water | 0.01–0.1 | 0.03 |

Preferably, the stripper overhead gas may be combined with the flash overhead gas prior to the point at which these gases are admitted to the rectification operation.

A second portion, the condensed overhead product from the rectification operation, typically 25% to 80%, say 59.3%, or 40 to 200 parts, say 102.5 parts, of the first or hydrocarbon phase, may be recovered and dried. Typically, this may be effected in a hydrocarbon drying tower. Charge may be at 20° C. to 120° C., say 40° C., and it may be admitted to a stripping section at 0 p.s.i.g. to 150 p.s.i.g., say 20 p.s.i.g. The charge may pass downwardly through the stripping section, which may preferably include a reboiler to yield as bottoms a diluent-solvent, which may be recycled, having the following composition:

TABLE XII

| Component | Typical parts | Preferred parts |
|---|---|---|
| Unreacted ethylene | 0.002-0.2 | 0.04 |
| Unreacted higher alpha olefin | 1-5 | 2.78 |
| Unreacted third monomer | 0-0.1 | 0 |
| Diluent-solvent | 80-150 | 99.73 |
| Heavy-impurities | 0.001-0.1 | 0.004 |
| Water | 0-0.05 | 0.015 |

The drying tower overhead may have the following composition:

TABLE XIII

| Component | Typical parts | Preferred parts |
|---|---|---|
| Unreacted ethylene | 0.002-0.2 | 0.04 |
| Unreated higher alpha olefin | 1-5 | 2.78 |
| Unreacted third monomer | 0-0.1 | 0 |
| Diluent-solvent | 5-35 | 10 |
| Heavy impurities | 0-0.1 | 0 |
| Water | 0-0.05 | 0.015 |

This overhead at 40° C. to 130° C., say 76° C., in amount of 5 to 45 parts, say 12.8 parts, may be combined with the rectification operation overhead gas and condensed therewith.

Practice of the novel process of this invention may be carried out in accordance with the flowsheet set forth in the drawings wherein.

Figure 1:
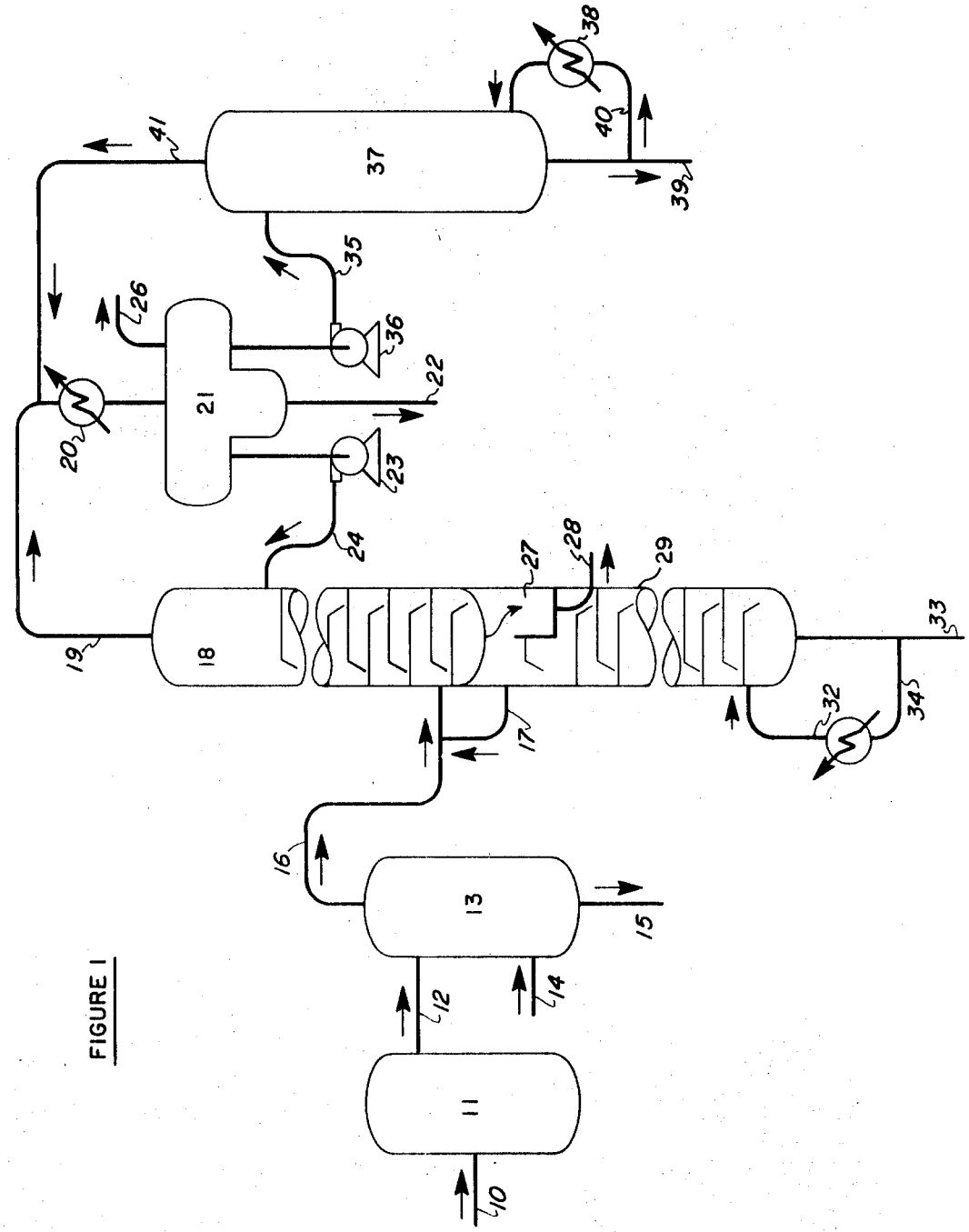
FIG. 1 represents a preferred embodiment of the process of this invention.

In the drawings, charge may be fed through at least one charge line, schematically designated line 10, to reactor 11 wherein polymerization may be carried out. Reactor effluent may be withdrawn therefrom through line 12 and, with or without intermediate operations not shown, may be passed to flash drum 13. Steam may be admitted thereto through line 14 and flashed bottoms may be withdrawn through line 15.

Flash overhead gas may be withdrawn through line 16 and passed therethrough to join with line 17 and, thence, to admit gas contained therein to rectification operation 18. Overhead from rectifier 18 may be withdrawn through line 19 and passed therethrough to condenser 20, wherein condensation is effected, the condensate being collected in reflux drum 21. Lower aqueous phase may be withdrawn therefrom through line 22; and reflux may pass through reflux pump 23 and line 24. Uncondensed gas may be withdrawn through line 26.

Rectifier bottoms may be collected in chamber 27 and the lower aqueous phase withdrawn through line 28. The non-aqueous phase, in the embodiment of FIG. 1, may be passed as overflow from chamber 27 to stripping operation 29. In FIG. 1, the stripping operation may be carried out in the same structure as that in which the rectification is carried out.

Figure 2:
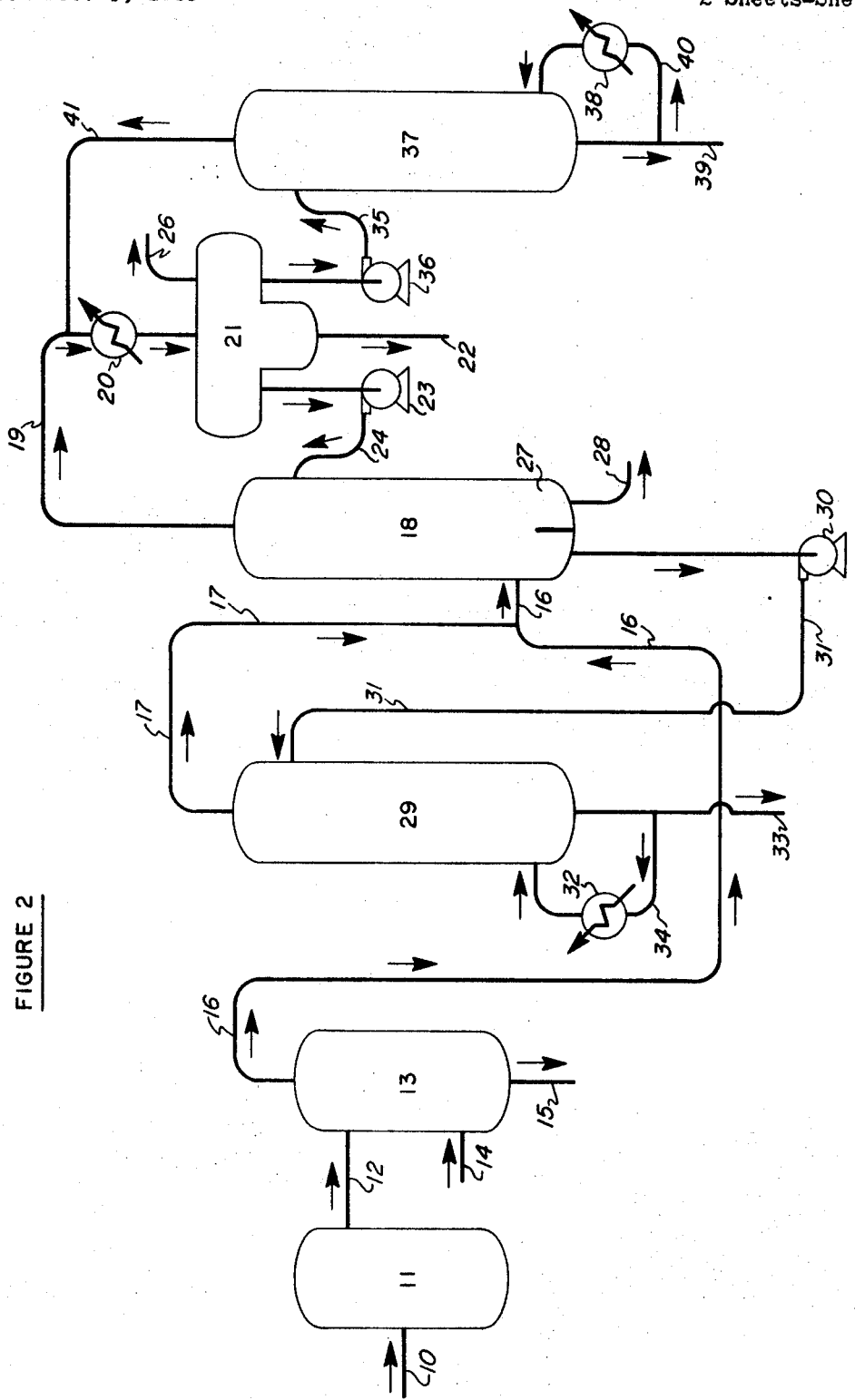
FIG. 2 represents an alternative embodiment of the process of this invention.

In the embodiment of FIG. 2, the stripping operation may be carried out in a different tower from that in which the rectification may be carried out; and a pump 30 may pass rectifier bottoms through line 31 to stripper 29.

Stripper 29 may preferably include reboiler 32. Bottoms may be withdrawn through line 33 and reboiler feed may pass through line 34. Stripper overhead may pass through line 17 to line 16.

Condensed rectifier overhead in reflux drum 21 may be passed through line 35 and pump 36 to hydrocarbon drying tower 37 including reboiler 38. Bottoms therefrom may be withdrawn through line 39, a portion thereof passing through line 40 in the reboiler circuit. Overhead in line 41 may be recovered and passed to line 19 and thence to condenser 20.

Practice of the novel process of this invention may be apparent from the following specific example wherein, as elsewhere in this description, all parts are parts by weight unless otherwise indicated.

EXAMPLE 1

In this example (which represents practice of a preferred embodiment of this invention) 2.75 parts of ethylene, 12.5 parts of pyropylene, and 0.22 parts of 5-ethylidene-2-norbornene (ENB) may be introduced through line 10 into a polymerization reactor 11 together with 0.00865 part of vanadium tetrachloride catalyst and 0.042 part of diethyl aluminum chloride cocatalyst and 100 parts of hexane. After reaction at 30° C. and 60 p.s.i.g. for 15 minutes, the reaction mixture containing 5.1 parts of terpolymer may be withdrawn from the reaction vessel through line 12 and contacted with 60 parts of water to extract spent catalyst.

The organic layer (polymer cement) may be removed from the aqueous layer and passed through line 12 to flash drum 13 wherein it may be vaporized by steam injection from line 14. The terpolymer residue may be withdrawn at 100° C. and 15 p.s.i.g. through line 15, being further treated to recover terproduct. The flash overhead gas in line 16 may contain the following components:

TABLE XIV

| Component: | Parts |
|---|---|
| Ethylene | 0.275 |
| Propylene | 9.85 |
| ENB | 0.065 |
| Hexane | 100 |
| Water (vapor) | 15.8 |
| Heavy impurities | 0.075 |

Flash overhead gas may be passed through line 16 and combined with stripper overhead vapor in line 17 to yield a combined or total gas charge to rectifier 18, having the following composition:

TABLE XV

| Component: | Parts |
|---|---|
| Ethylene | 0.275 |
| Propylene | 9.91 |
| ENB | 0.220 |
| Hexane | 138.03 |
| Water (vapor) | 15.8 |
| Heavy impurities | 0.839 |

Charge gas in line 16 at 93° C. and 15 p.s.i.g. in amount of 126 parts may be admitted to rectifier 18. Overhead therefrom in line 19 at 74° C. and 10 p.s.i.g. may contain the following components:

TABLE XVI

| Component: | Parts |
|---|---|
| Ethylene | 0.315 |
| Propylene | 11.69 |
| ENB | 0 |
| Hexane | 168 |
| Water (vapor) | 10 |
| Heavy impurities | 0.008 |

Overhead may be combined with gas from line 41 and condensed at 40° C. and 5 p.s.i.g. to yield 182.2 parts of condensate having the following composition:

TABLE XVII

| Component: | Parts |
|---|---|
| Ethylene | 0.08 |
| Propylene | 4.62 |
| ENB | 0 |
| Hexane | 167.9 |
| Water (aqueous phase) | 9.67 |
| Water (dissolved in diluent-solvent) | 0.03 |
| Heavy impurities | 0.008 |

70.2 parts of reflux supernatant hydrocarbon liquid phase in reflux drum 21 may be passed through pump 23 and line 24 to rectifier 18. 9.67 parts of aqueous liquid at 40° C. may be withdrawn from drum 21 through line 22 having the following composition:

TABLE XVIII

| Component: | Parts |
|---|---|
| Liquid water | 9.67 |

Non-condensed gas may be withdrawn from reflux drum 21 through line 26 having the following composition:

TABLE XIX

| Component: | Parts |
|---|---|
| Unreacted ethylene | 0.275 |
| Unreacted higher alpha olefin | 9.85 |
| Unreacted third monomer | 0 |
| Diluent-solvent | 10.1 |
| Water | 0.3 |

Rectifier bottoms at 75° C. and 15 p.s.i.g. may be collected in chamber 27 from which aqueous lower layer in amount of 5.8 parts may be withdrawn through line 28. Non-aqueous bottoms may be passed (through pump 30 and line 31 of FIG. 2 or directly as in FIG. 1) to the stripper. Typically, they may have the following composition:

TABLE XX

| Component, non-aqueous phase: | Parts |
|---|---|
| Unreacted ethylene | 0 |
| Unreacted higher alpha olefin | 0.06 |
| Unreacted third monomer | 0.22 |
| Diluent-solvent | 38.2 |
| Heavy impurities | 0.835 |
| Water (dissolved in diluent-solvent) | 0.03 |
| Component, aqueous phase: | |
| Water | 5.8 |

Stripper 29, operating at 20 p.s.i.g., may yield a bottoms at 138° C. having the following composition:

TABLE XXI

| Component: | Parts |
|---|---|
| Unreacted ethylene | 0 |
| Unreacted higher alpha olefin | 0 |
| Unreacted third monomer | 0.065 |
| Diluent-solvent | 0.173 |
| Water (dissolved in diluent-solvent) | 0 |
| Heavy impurities | 0.072 |

102.5 parts of non-aqueous hydrocarbon phase in reflux drum 21 may be passed through line 35 and pump 36 to drying tower operation at 20 p.s.i.g. Bottoms therefrom at 93° C. and 25 p.s.i.g. may have the following composition:

TABLE XXII

| Component: | Parts |
|---|---|
| Unreacted ethylene | 0 |
| Unreacted higher alpha olefin | 0 |
| Unreacted third monomer | 0 |
| Diluent-solvent | 89.73 |
| Heavy impurities | 0.004 |
| Water | 0 |

Overhead from tower 37 at 76° C. and 20 p.s.i.g. may have the following composition:

TABLE XXIII

| Component: | Parts |
|---|---|
| Unreacted ethylene | 0.04 |
| Unreacted higher alpha olefin | 2.78 |
| Unreacted third monomer | 0 |
| Diluent-solvent | 10 |
| Heavy impurities | 0 |
| Water | 0.015 |

It will be apparent to those skilled in the art that this invention permits recovery of desired components in the flash drum overhead in maximum efficiency and at decreased cost. The system eliminates the steps of condensation of flash drum overhead and drying of the condensed liquid prior to further treatment including distillation. It is particularly characterized by the elimination of several condensation and vaporization steps and by the decreased utility requirements called for. It is also a particular feature of this invention that, dependent upon the particular nature and quantity of the charge, the major operations may be carried out in one or two columns—thus providing flexibility.

Although this invention has been illustrated by reference to specific embodiments, it will be apparent to those skilled in the art that various changes and modifications may be made which clearly fall within the scope of this invention.

What is claimed is:

1. In the process for preparing a copolymer of ethylene and a $C_3$ to $C_{10}$ higher alpha olefin including forming a mixture of monomers of ethylene and $C_3$ to $C_{10}$ higher alpha olefin; contacting said mixtures in a reaction medium including a liquid diluent-solvent with a polymerization catalyst composition thereby forming a copolymer of ethylene and a $C_3$ to $C_{10}$ higher alpha olefin; withdrawing from said reaction medium a liquid reactor effluent containing catalyst composition, unreacted monomers, heavy impurities, and a cement of copolymer in said liquid diluent-solvent; deactivating the catalyst composition; removing the same from said liquid reactor effluent; and recovering diluent-solvent, the improvement which comprises:

(a) flashing said liquid reactor effluent in the presence of steam thereby forming a flash overhead gas containing diluent-solvent, unreacted monomers, heavy impurities, and water;

(b) rectifying said flash overhead gas thereby forming a two-phase rectifier bottoms including (i) a non-aqueous phase containing diluent-solvent and heavy impurities and (ii) an aqueous phase; and (iii) a rectifier overhead containing diluent-solvent, unreacted monomers, and water;

(c) stripping the non-aqueous phase of said rectifier bottoms thereby forming (i) stripper bottoms, containing a major portion of said heavy impurities and (ii) stripper overhead containing diluent-solvent;

(d) recycling said stripper overhead to said rectifying operation and withdrawing stripper bottoms from the systems;

(e) condensing said rectifier overhead, separately recovering (i) unreacted monomers gas, (ii) condensed non-aqueous phase containing diluent-solvent substantially free of heavy impurities, and (iii) condensed water;

(f) passing a first portion of said condensed non-aqueous phase to said rectifying operation as reflux;

(g) separately withdrawing a second portion of said condensed non-aqueous phase;

(h) passing said second portion to a hydrocarbon drying operation;

(i) recycling overhead uncondensed vapor monomers, diluent-solvent, and water to (e) and recovering water to (e) and recovering water-free diluent-solvent as bottoms from said operation (h).

2. In the process of claim 1, the improvement wherein said flash overhead gas contains heavy impurities in amount of 0.01–0.1 part per 100 parts of diluent-solvent.

3. In the process of claim 1, the improvement wherein said rectifying operation is carried out at feed temperature of 80° C.–150° C. and feed pressure of 0–50 p.s.i.g.

4. In the process of claim 1, the improvement wherein said rectifier overhead contains less than 70% of the heavy impurities in said flash overhead gas.

5. In the process of claim 1, the improvement wherein said rectifier overhead gas contains less than 15% of the heavy impurities in said flash overhead gas.

6. In the process of claim 1, the improvement wherein said rectifier overhead contains 1.3%–70% of the heavy impurities in said flash overhead gas.

7. In the process of claim 1, the improvement wherein said stripper bottoms contain at least 30% of the heavy impurities in said flash overhead gas.

8. In the process of claim 1, the improvement wherein said stripper bottoms contains 30%–100% of the heavy impurities in said flash overhead gas.

9. In the process for preparing a copolymer of ethylene, a $C_3$ to $C_{10}$ higher alpha olefin and a non-conjugated diolefin including forming a mixture of monomers of ethylene, $C_3$ to $C_{10}$ higher alpha olefin and a non-conjugated diolefin; contacting said mixtures in a reaction medium including a liquid diluent-solvent with a polymerization catalyst composition thereby forming a copolymer of ethylene, a $C_3$ to $C_{10}$ higher alpha olefin and a non-conjugated diolefin; withdrawing from said reaction medium a liquid reactor effluent containing catalyst composition, unreacted monomers, heavy impurities, and a cement of copolymer in said liquid diluent-solvent; deactivating the catalyst composition, removing the same from said liquid reactor effluent, and recovering diluent-solvent, the improvement which comprises:

(a) flashing said liquid reactor effluent in the presence of steam thereby forming a flash overhead gas containing diluent-solvent, unreacted monomers, heavy impurities, and water;

(b) rectifying said flash overhead gas thereby forming: a two-phase rectifier bottoms including (i) a non-aqueous phase containing diluent-solvent and heavy impurities and (ii) an aqueous phase; and (iii) a rectifier overhead containing diluent-solvent, unreacted monomers, and water;

(c) stripping the non-aqueous phase of said rectifier bottoms thereby forming (i) stripper bottoms, containing a major portion of said heavy impurities and (ii) stripper overhead containing diluent-solvent;

(d) recycling said stripper overhead to said rectifying operation and withdrawing stripper bottoms from the system;

(e) condensing said rectifier overhead, separately recovering (i) unreacted monomers gas, (ii) condensed non-aqueous phase containing diluent-solvent substantially free of heavy impurities, and (iii) condensed water;

(f) passing a first portion of said condensed non-aqueous phase to said rectifying operation as reflux;

(g) separately withdrawing a second portion of said condensed non-aqueous phase;

(h) passing said second portion to a hydrocarbon drying operation;

(i) recycling overhead uncondensed vapors of monomers, diluent-solvent, and water to (e) and recovering water-free diluent-solvent as bottoms from said operation (h).

10. In the process of claim 9, the improvement wherein said $C_3$ to $C_{10}$ higher alpha olefin is propylene.

11. In the process of claim 9, the improvement wherein said non-conjugated diolefin is 5-ethylidene-2-norbornene.

12. In the process of claim 9, the improvement wherein said rectifier overhead contains less than 70% of the heavy impurities in said flash overhead gas.

References Cited
UNITED STATES PATENTS

| | | | |
|---|---|---|---|
| 3,360,444 | 12/1967 | Leibson et al. | 203—41 |
| 3,437,645 | 4/1969 | Paige et al. | 260—80.78 |

JOSEPH L. SCHOFER, Primary Examiner

R. A. GAITHER, Assistant Examiner

U.S. Cl. X.R.

260—88.2 E